US012772051B2

(12) United States Patent
Orr et al.

(10) Patent No.: US 12,772,051 B2
(45) Date of Patent: Oct. 20, 2026

(54) ROAMING BETWEEN ACCESS POINTS IN THE SAME ESS USING PRE-DERIVED PTKS

(71) Applicant: Cisco Technology, Inc., San Jose, CA (US)

(72) Inventors: Stephen M Orr, Wallkill, NY (US); Malcolm Muir Smith, Richardson, TX (US); Indermeet Singh Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 425 days.

(21) Appl. No.: 18/356,494

(22) Filed: Jul. 21, 2023

(65) Prior Publication Data

US 2024/0381077 A1 Nov. 14, 2024

Related U.S. Application Data

(60) Provisional application No. 63/501,826, filed on May 12, 2023.

(51) Int. Cl.

*H04W 12/0431* (2021.01)

*H04W 12/041* (2021.01)

(52) U.S. Cl.

CPC ..... *H04W 12/0431* (2021.01); *H04W 12/041* (2021.01)

(58) Field of Classification Search

CPC ........................ H04W 12/0431; H04W 12/041

See application file for complete search history.

(56) References Cited

U.S. PATENT DOCUMENTS

2006/0067526 A1* 3/2006 Faccin .................. H04L 9/0844 380/263

2009/0262718 A1 10/2009 Meier et al.

(Continued)

FOREIGN PATENT DOCUMENTS

WO WO-2022259858 A1 * 12/2022 ............ H04W 12/50

OTHER PUBLICATIONS

IEEE: "Draft Standard for Broadband Over Power Line Networks: Medium Access Control and Physical Layer Specifications Proposal for the IEEE 1901 In-Home Power Line Networks Communications Standard", IEEE Draft P1901_0387_R7 Merged_Homeplug_Panasonic_HI_Silicon_IH, IEEE-SA, Piscataway, NJ USA, vol. 1901, No. r7, Dec. 16, 2008, 1251 Pages, XP017757962, Retrieved on Dec. 17, 2008, p. 59-63, p. 325-391.

(Continued)

*Primary Examiner* — Dhaval V Patel

(74) *Attorney, Agent, or Firm* — Polsinelli P.C.

(57) ABSTRACT

The present technology provides a mechanism for more efficient make-before-you-break roaming (MMBR) between devices in the same extended service set (ESS) that utilize a common Pairwise Master Key (PMK). Association and key management (AKM) procedures can be time-consuming, and the present technology provides for a more efficient mechanism by which the Pairwise Transient Key (PTK) can be derived in advance so that the STA can directly associate with a new AP. More specifically, the Robust Security Network Information Element (RSNIE) that is exchanged prior to key derivation and association between the STA and the AP can be enhanced to include information about the security protocols used by other APs in the extended service set (ESS), which can be used to derive respective Pairwise Transient Keys (PTKs) in advance for use with other APs.

20 Claims, 7 Drawing Sheets

(56) References Cited

U.S. PATENT DOCUMENTS

| | | | | |
|---|---|---|---|---|
| 2010/0241854 | A1 | 9/2010 | Yao et al. | |
| 2014/0136844 | A1 | 5/2014 | Ding et al. | |
| 2014/0355564 | A1 | 12/2014 | Cherian et al. | |
| 2016/0142915 | A1 | 5/2016 | Choyi et al. | |
| 2021/0084493 | A1 | 3/2021 | Naribole et al. | |
| 2021/0345105 | A1* | 11/2021 | Peer | H04W 12/0433 |
| 2021/0368322 | A1* | 11/2021 | Seok | H04W 12/041 |
| 2022/0022033 | A1 | 1/2022 | Ho et al. | |
| 2022/0353677 | A1* | 11/2022 | Huang | H04W 12/0433 |
| 2023/0269581 | A1* | 8/2023 | Ho | H04W 12/03 713/171 |
| 2023/0308506 | A1* | 9/2023 | Qi | H04L 67/104 |

OTHER PUBLICATIONS

International Search Report and Written Opinion for International Application No. PCT/US2024/026019, mailed Aug. 8, 2024, 13 Pages.

* cited by examiner

ROAMING BETWEEN ACCESS POINTS IN THE SAME ESS USING PRE-DERIVED PTKS

CROSS-REFERENCE TO RELATED APPLICATIONS

This application claims priority to U.S. provisional application No. 63/501,826, filed on May 12, 2023, which is expressly incorporated by reference herein in its entirety.

BACKGROUND

Wi-Fi 7 provides various new capabilities that enable a multi-link capable station (STA), to establish multiple links with the same access point (AP). The multi-link security used in Wi-Fi 7 fails under current proposals for Wi-Fi 8 in which it is proposed to establish STA sessions/links across multiple physical APs. As described below for Wi-Fi 7, the pairwise transit key (PTK) for the links are derived from MAC addresses for the respective MLDs, i.e., one per AP and one per STA. For Wi-Fi 8, however, it is proposed to establish sessions/links across multiple physical APs, but the security protocol used for Wi-Fi 7 fails for links that a spread over two or more physical APs because different physical APs have different multi-link device (MLD) MAC addresses, which is a limitation that Wi-Fi 8 does not have.

In Wi-Fi 7, multi-link security is provided by first establishing a multi-link association between a STA (i.e., non-AP MLD) and an AP (i.e., AP MLD). After a successful multi-link association is established between the STA and the AP, a Pairwise Master Key (PMK) is established, and the Pairwise Master Key (PMK) is then used to derive a Pairwise Transient Key (PTK) by performing a 4-way handshake encryption protocol between the non-AP MLD and the AP (i.e., AP MLD). The Pairwise Master Key (PMK), Pairwise Transient Key (PTK) and the same packet number (PN) space are used for all the setup links between the STA (i.e., non-AP MLD) and the AP (i.e., AP MLD) for the Pairwise Transient Key Security Association (PTKSA). For example, the Pairwise Transient Key (PTK) can be derived from the sum Pairwise Master Key (PMK)+ANONCE+SNONCE+MAC (AA)+MAC (SA)), where ANONCE and SNONCE are random numbers provided respectively at the AP and STA, MAC (AA) is the MAC address of the AP (i.e., the MAC address of the authenticator), MAC (SA) is the MAC address of the STA (i.e., supplicant). Thus, the security keys (Pairwise Transient Key (PTK)) for the links are derived from MLD-MAC (one per AP and one per STA).

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
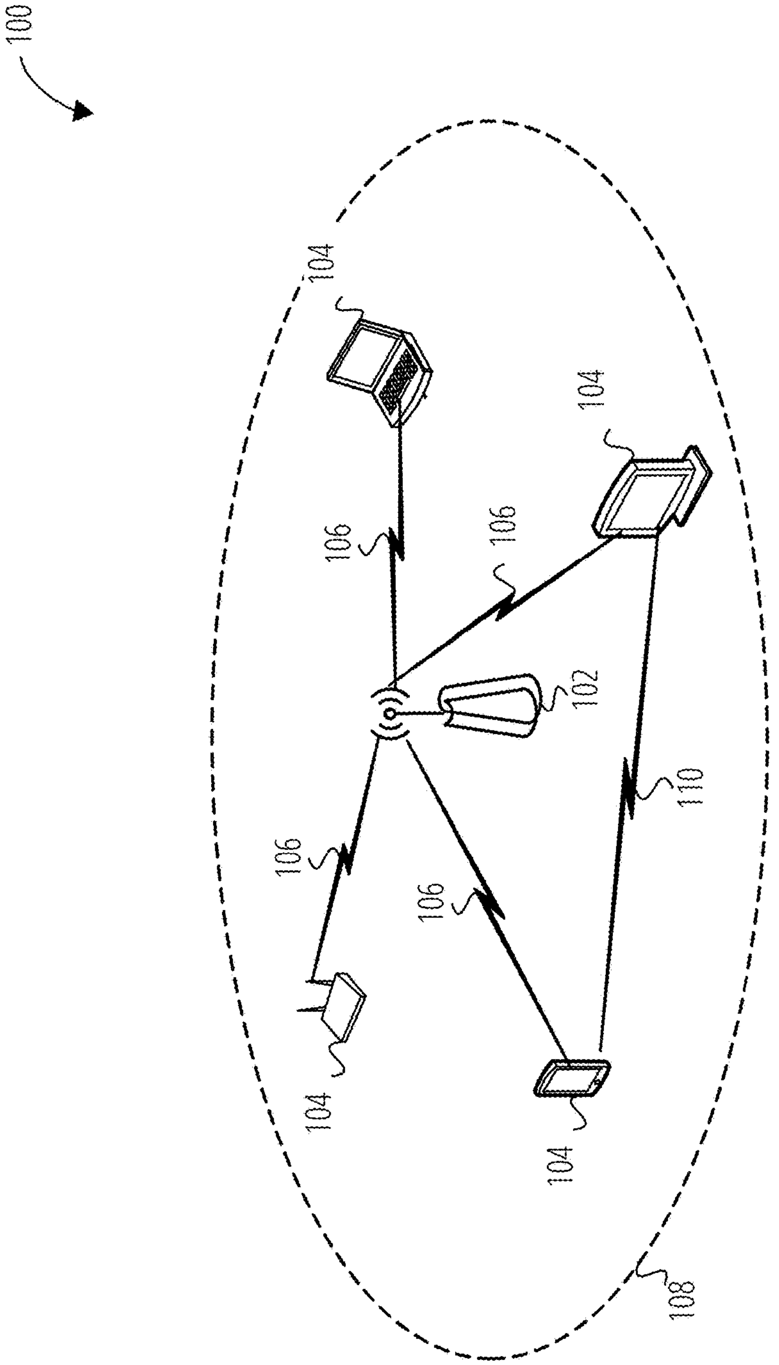
FIG. 1 illustrates a block diagram of an example wireless communication network according to some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

OVERVIEW

Abbreviations

Extremely high throughput (EHT)
Station (STA)
Robust Security Network Information Element (RSNIE)
Association and key management (AKM)
Pairwise Master Key (PMK)
Pairwise Transient Key (PTK)
Basic service set (BSS)
Access Point (AP)
Wireless LAN Controller (WLC)
Wi-Fi Protected Access (WPA)
MLD: Multi-Link Device
MLO: Multi-link operation
Extended Service Set (ESS)
Service Set Identifier (SSID)
Wireless Local Area Network (WLAN)
Advanced Encryption Standard (AES)
Fast Transition (FT)
Make-before-you-break roaming (MMBR)

In one aspect, a the present technology includes receiving, by an STA, a Pairwise Master Key Security Association (PMKSA) including information regarding aspects of a first security protocol used by a first Wi-Fi AP and aspects of a second security protocol used by a second Wi-Fi AP. The PMKSA can be used to derive a first Pairwise Transient Key Security Association (PTKSA) and a first Pairwise Transient Key (PTK) from a Pairwise Master Key (PMK) and the information regarding the aspects of the first security protocol. The first Pairwise Transient Key Security Association (PTKSA) can be used in connecting to the first Wi-Fi AP utilizing the first security protocol. Prior to connecting to the second Wi-Fi AP, the present technology can derive, by the STA, a second Pairwise Transient Key Security Association (PTKSA) and a second Pairwise Transient Key (PTK) from the Pairwise Master Key (PMK) and the information regarding the aspects of the second security protocol.

The present technology may also include further includes detecting, by the STA a beacon from the second Wi-Fi AP identifying the second Wi-Fi AP, and connecting, by the STA, to the second Wi-Fi AP using the second Pairwise Transient Key Security Association (PTKSA), where the connecting to the second Wi-Fi AP is performed without performing a AKM protocol with the second Wi-Fi AP.

The present technology may also include further includes encrypting communications between the STA and the second Wi-Fi AP with the second Pairwise Transient Key (PTK).

The present technology may also include where the information regarding the first security protocol is a first AKM version and a first cipher suite used by the first Wi-Fi AP, and the information regarding the second security protocol is a second AKM version and a second cipher suite used by the second Wi-Fi AP.

The present technology may also include where the first Wi-Fi AP and the second Wi-Fi AP are part of an extended service set (ESS), where the first Wi-Fi AP and the second Wi-Fi AP utilized the Pairwise Master Key (PMK).

The present technology may also include where the information regarding the aspects of the first security protocol in the Pairwise Master Key Security Association (PMKSA) is identified as priority for use in deriving the first Pairwise Transient Key Security Association (PTKSA) needed to connect to the first Wi-Fi AP.

The present technology may also include where the STA is a multi-link device (MLD), the where the connecting to the second Wi-Fi AP occurs while the STA remains connected to the first Wi-Fi AP.

Other technical features may be readily apparent to one skilled in the art from the following figures, descriptions, and claims.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present technology provides a mechanism for more efficient make-before-you-break roaming (MMBR) between devices in the same extended service set (ESS) that utilize a common Pairwise Master Key (PMK). Generally, when a STA associates with a new AP, the STA and AP undergo association and key management (AKM) protocols under WPA-2 or WPA-3 to derive a Pairwise Transient Key (PTK). The association and key management (AKM) procedures can be time-consuming, and the present technology provides for a more efficient mechanism by which the Pairwise Transient Key (PTK) can be derived in advance so that the STA can directly associate with a new AP. More specifically, the Robust Security Network Element (RSNE) that is exchanged prior to key derivation and association between the STA and the AP can be enhanced to include information about the security protocols used by other APs in the extended service set (ESS) in its Robust Security Network Information Element (RSNIE), which can be used to derive respective Pairwise Transient Keys (PTKs) in advance for use with other APs.

The present technology is further able to facilitate roaming by a STA within an extended service set (ESS) between APs that utilize different versions of the Wi-Fi standard. For example, existing Wi-Fi deployments can include a mix of Wi-Fi 5, 6, and 7 devices, and in the near future, these deployments may also include Wi-Fi 8 devices too. The Robust Security Network Information Element (RSNIE) can include details about the security protocols employed by other APs in the extended service set (ESS). The details about the security protocols employed by the other APs can include the cipher suites used by other APs. This mechanism will facilitate the STA being prepared to communicate using the appropriate cipher suite for the Wi-Fi 502.11 version utilized by the AP.

The present technology can further improve multi-link operation across Wi-Fi generations using different security protocols. The details about the security protocols employed by the other APs in the Robust Security Network Information Element (RSNIE) can also enable the multi-link device (MLD) AP to be prepared to communicate directly with APs of other generations.

The present disclosure does acknowledge that Wi-Fi 8 is the first generation to explicitly allow connections between a multi-link device (MLD) STA and multiple different APs sharing security associations and that such connection across multi-link operation APs is not compatible with Wi-Fi 7 because the security associations established under Wi-Fi 7 rely on specific MAC address pairings between the specific AP and STA. The present technology also acknowledges that Wi-Fi 6 and earlier do not contemplate multi-link operation, and would experience the same MAC address pairing limitations. However, the present disclosure contemplates minor adjustments to earlier generations of Wi-Fi can be made to accommodate the benefits of the present technology and the realities of deployment of mixed generations of Wi-Fi devices in order to gain the benefit of capabilities of multi-link device (MLD) STAs. Thus, assuming adjustments to earlier generations of Wi-Fi, the present technology can enable a multi-link device (MLD) STA to connect to any pair of Wi-Fi APs, regardless of their generation. And even if such adjustments are not made to currently deployed generations of Wi-Fi, the present disclosure contemplates the forward-looking benefits of the present technology as future generations of Wi-Fi support multi-link operation, but utilize ever-improving security protocols.

A used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

Aspects of the present disclosure can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

IEEE 802.11, commonly referred to as Wi-Fi, has been around for three decades and has become arguably one of the most popular wireless communication standards, with billions of devices supporting more than half of the worldwide wireless traffic. The increasing user demands in terms of throughput, capacity, latency, spectrum, and power efficiency calls for updates or amendments to the standard to keep up with them. As such, Wi-Fi generally has a new amendment after every few years with its own characteristic features. In the earlier generations, the focus was primarily on higher data rates, but with ever-increasing density of devices, area efficiency has become a major concern for Wi-Fi networks. Due to this issue, the last (802.11 be (Wi-Fi 7)) amendments focused more on efficiency though higher data rates were also included. The next expected update to IEEE 802.11 is coined as Wi-Fi 8. Wi-Fi 8 will attempt to further enhance throughput and minimize latency to meet the ever-growing demand for the Internet of Things (IoT), high-resolution video streaming, low-latency wireless services, etc.

Multiple Access Point (AP) coordination and transmission in Wi-Fi refers to the management of multiple access points in a wireless network to avoid interference and ensure efficient communication between the client devices and the network. When multiple access points are deployed in a network—for instance in buildings and office complexes—they operate on the same radio frequency, which can cause interference and degrade the network performance. To mitigate this issue, access points can be configured to coordinate their transmissions and avoid overlapping channels.

Wi-Fi 7 introduced the concept of multi-link operation (MLO), which gives the devices (Access Points (APs) and Stations (STAs)) the capability to operate on multiple links (or even bands) at the same time. MLO introduces a new paradigm to multi-AP coordination which was not part of the earlier coordination approaches. MLO is considered in Wi-Fi-7 to improve the throughput of the network and address the latency issues by allowing devices to use multiple links.

A multi-link device (MLD) may have several “affiliated” devices, each affiliated device having a separate PHY interface, and the MLD having a single link to the Logical Link Control (LLC) layer. In IEEE 802.11be, a multi-link device (MLD) is defined as: “A device that is a logical entity and has more than one affiliated station (STA) and has a single medium access control (MAC) service access point (SAP) to logical link control (LLC), which includes one MAC data service” (see: LAN/MAN Standards Committee of the IEEE Computer Society, Amendment 8: Enhancements for extremely high throughput (EHT), IEEE P802.11 be™/D0.1, September 2020, section 3.2). Connection(s) with an MLD on the affiliated devices may occur independently or jointly. A preliminary definition and scope of a multi-link element is described in section 9.4.2.247b of aforementioned IEEE 802.11 be draft. An idea behind this information element/container is to provide a way for multi-link devices (MLDs) to share the capabilities of different links with each other and facilitate the discovery and association processes. However, this information element may still be changed or new mechanisms may be introduced to share the MLO information (e.g. related to backhaul usage).

In multi-link operation (MLO) both STA and APs can possess multiple links that can be simultaneously active. These links may or may not use the same bands/channels.

MLO allows sending PHY protocol data units (PPDUs) on more than one link between a STA and an AP. The links may be carried on different channels, which may be in different frequency bands. Based on the frequency band and/or channel separation and filter performance, there may be restrictions on the way the PPDUs are sent on each of the links.

MLO may include a basic transmission mode, an asynchronous transmission mode, and a synchronous transmission mode.

In a basic transmission mode, there may be multiple primary links, but a device may transmit PPDU on one link at a time. The link for transmission may be selected as follows. The device (such as an AP or a STA) may count down a random back off (RBO) on both links and select a link that wins the medium for transmission. The other link may be blocked by in-device interference. In basic transmission mode, aggregation gains may not be achieved.

In an asynchronous transmission mode, a device may count down the RBO on both links and perform PPDU transmission independently on each link. The asynchronous transmission mode may be used when the device can support simultaneous transmission and reception with bands that have sufficient frequency separation such as separation between the 2.4 GHz band and the 5 GHz band. The asynchronous transmission mode may provide both latency and aggregation gains.

In a synchronous PPDU transmission mode, the device may count down the RBO on both links. If a first link wins the medium, both links may transmit PPDUs at the same time. The transmission at the same time may minimize in-device interference and may provide both latency and aggregation gains.

Multi-AP coordination and MLO are two features proposed to improve the performance of Wi-Fi networks in the upcoming IEEE 802.11 be amendment. Multi-AP coordination is directed toward utilizing (distributed) coordination between different APs to reduce inter-Basic Service Set (BSS) interference for improved spectrum utilization in dense deployments. MLO, on the other hand, supports high data rates and low latency by leveraging flexible resource utilization offered by the use of multiple links for the same device.

FIG. 1 illustrates a block diagram of an example wireless communication network according to some aspects of the present technology. Wireless communication network 100 can be an example of a wireless local area network (WLAN) such as a Wi-Fi network (and will hereinafter be referred to as WLAN 100). For example, WLAN 100 can be a Wi-Fi network operating based on any currently available or to be developed IEEE 802.11 protocols and standards (e.g., 802.11 ay, 802.11 ax, 802.11az, 802.11ba and 802.11be, 802.11ce etc.). WLAN 100 may include wireless communication devices such as an AP 102 and multiple STAs 104. The number of APs and STAs are not limited to that shown in FIG. 1 and can be more or less. Any one or more of AP 102 and STAs 104 may be capable of MLO (multi-link reception and/or transmission).

Each of STAs 104 can be any one or more of mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), IoT devices, etc.

A single AP 102 and an associated set of STAs 104 may be referred to as a basic service set (BSS), managed by AP 102.

FIG. 1 shows an example coverage area 108 of AP 102, which may represent a basic service area (BSA) of WLAN 100. BSS may be identified to users by a service set identifier (SSID), as well as to other devices by a basic service set identifier (BSSID), which may be a medium access control (MAC) address of AP 102. AP 102 can periodically broadcast beacons including BSSID to enable any STA 104 within wireless range of AP 102 to "associate" or re-associate with AP 102 to establish a communication link 106 with AP 102. For example, the beacons can include an identification of a primary channel used by respective AP 102 as well as a timing synchronization function for establishing or maintaining timing synchronization with AP 102.

To establish a communication link 106 with an AP 102, each of STAs 104 is configured to perform passive or active scans on frequency channels in one or more frequency bands (for example, the 2.4 GHZ, 5 GHZ, 6 GHZ or 60 GHz bands). Passive scans entail an STA 104 listening for beacons transmitted by AP 102 at a periodic time interval referred to as the target beacon transmission time (TBTT) (measured in time units (TUs) where one TU may be equal to 1024 microseconds (μs)). Active scans entail an STA 104 generating and sequentially transmitting probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with a selected AP 102. AP 102 assigns an association identifier to STA 104 at the conclusion of the association operations, which AP 102 can then utilize to track STA 104.

As a result of the increasing ubiquity of wireless networks, an STA 104 may have the opportunity to select one of many APs 102 within range of the STA or to select among multiple APs 102 that together form an extended service set (ESS) including multiple connected APs 102. An extended network station associated with WLAN 100 may be connected to a wired or wireless distribution system that may allow multiple APs 102 to be connected in such an ESS. As such, an STA 104 can be covered by more than one AP 102 and can associate with different APs 102 at different times for different transmissions. Additionally, after association with an AP 102, an STA 104 also may be configured to periodically scan its surroundings to find a more suitable AP 102 with which to associate. For example, an STA 104 that is moving relative to its associated AP 102 may perform a roaming scan to find another AP 102 having more desirable network characteristics such as a greater received signal strength indicator (RSSI), a reduced traffic load, etc.

In some cases, STAs 104 may form ad-hoc networks without APs 102. In some examples, ad hoc networks may be implemented within a larger wireless network such as WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication direct wireless link 110 regardless of whether both STAs 104 are associated with and served by same AP 102. In such an ad hoc system, one or more of STAs 104 may assume the role filled by AP 102 in a BSS. Such an STA 104 may coordinate transmissions within the ad hoc network. Examples of direct wireless links 110 include Wi-Fi Direct connections, connections established by using a Wi-Fi Tunneled Direct Link Setup (TDLS) link, and/or any other known or to be developed direct wireless communication scheme.

APs 102 and STAs 104 may function and communicate (via the respective communication links 106) according to the IEEE 802.11 family of wireless communication protocol standards. AP 102 and STAs 104 in WLAN 100 may transmit PPDUs over an unlicensed spectrum that can include frequency bands used by Wi-Fi technology, such as the 2.4 GHz band, the 5 GHz band, the 60 GHz band, the 3.6 GHz band, and the 900 MHz band. Some implementations of AP 102 and STAs 104 described herein also may communicate in other frequency bands, such as the 6 GHz band, which may support both licensed and unlicensed communications. AP 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4, 5 GHZ, or 6 GHz bands, each of which can be divided into multiple 20 MHz channels. PPDUs can be transmitted over a physical channel having a minimum bandwidth of 20 MHz or larger channels having bandwidths of 40 MHz, 80 MHz, 160 or 320 MHZ, etc., which can be formed by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
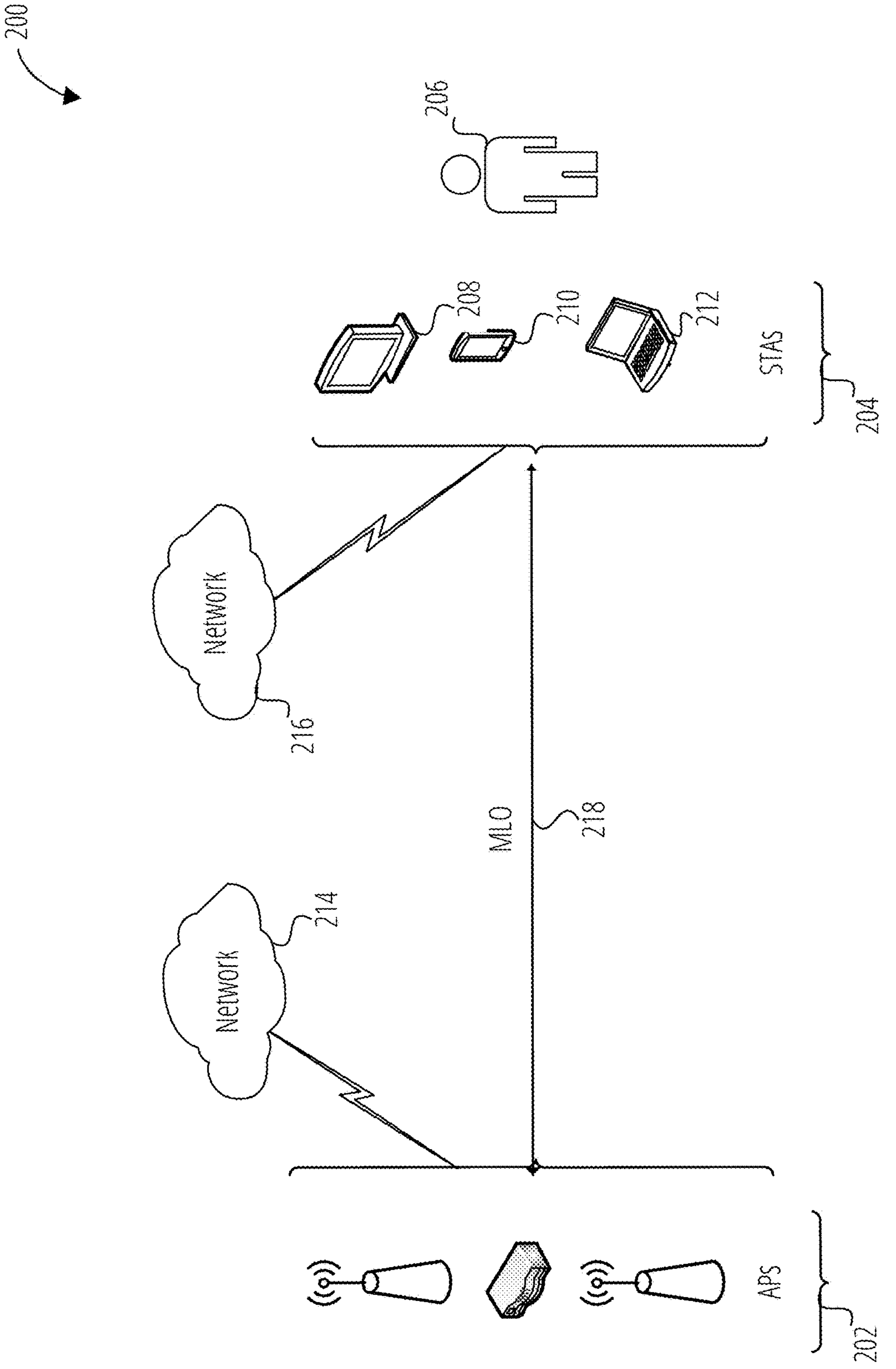
FIG. 2 is a network diagram illustrating an example network environment of multi-link operation, according to some aspects of the present technology.

FIG. 2 is a network diagram illustrating an example network environment of multi-link operation, according to some aspects of the present technology. Wireless network 200 may include one or more STAs 204 (includes example devices 208, 210, and 212) and one or more APs 202, which may communicate in accordance with IEEE 802.11 communication standards. STAs 204 and APs 202 may be the same as STAs 104 and AP 102 of FIG. 1, respectively.

One or more STAs 204 and/or APs 202 may be operable by one or more user(s) 206.

STAs 204 and/or APs 202 may also include mesh stations in, for example, a mesh network, in accordance with one or more IEEE 802.11 standards and/or 3GPP standards.

Any of STAs 204 and APs 202 may be configured to communicate with each other via one or more communications networks 214 and/or networks 216, which may be the same as WLAN 100. STAs 204 may also communicate peer-to-peer or directly with each other with or without APs 202. Any of the communications networks 214 and/or networks 216 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 214 and/or networks 214 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 214 and/or networks 216 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of STAs 204 and APs 202 may be configured to perform directional transmission and/or directional reception in conjunction with wirelessly communicating in a wireless network. Any of STAs 204 and APs 202 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of STAs 204 and APs 202 may be configured to perform any given directional transmission towards one or more defined transmit sectors. Any of STAs 204 and APs 202 may be configured to perform any given directional reception from one or more defined receive sectors.

Multiple Input-Multiple Output (MIMO) beamforming in a wireless network may be accomplished using RF beamforming and/or digital beamforming. In some embodiments, in performing a given MIMO transmission, STAs 204 and/or APs 202 may be configured to use all or a subset of its one or more communications antennas to perform MIMO beamforming.

Any of STAs 204 and APs 202 may include any suitable radio and/or transceiver for transmitting and/or receiving radio frequency (RF) signals in the bandwidth and/or channels corresponding to the communications protocols utilized by any of STAs 204 and APs 202 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In example embodiments, the radio component, in cooperation with the communications antennas, may be configured to communicate via 2.4 GHz channels (e.g., 802.11b, 802.11g. 802.11n, 802.11ax), 5 GHz channels (e.g., 802.11n, 802.11ac, 802.11ax), or 60 GHZ channels (e.g., 802.11ad, 802.11ay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In some examples, and with reference to FIG. 1, APs 102 may facilitate multi-link operation 218 with one or more STAs 204.

In one example, multi-link operation 218 may have a single-radio non-access point MLD (non-AP MLD, e.g. an STA 204) listen to two or more channels simultaneously by (1) configuring a 2×2 Tx/Rx (or M×M Tx/Rx) to allocate a 1×1 resource on each channel/band (e.g., 5 GHZ and 6 GHZ), (2) add extra Rx modules, or (3) add wake-up receivers. An AP MLD then transmits on any idle channel a control frame (e.g., request to send (RTS) or multi-user (MU) RTS) before either a single data frame or a group of data frames within a single transmit opportunity (TXOP) to indicate that frames will be transmitted on that channel. The non-AP MLD responds back with a control frame (e.g., clear to send (CTS)). The single-radio non-AP MLD configures its radio back to 2×2 Tx/Rx module on the channel it received the control frame from the AP MLD and receives data. When using a wake-up receiver (802.11ba), the AP MLD transmits a wake-up packet. This also could be extended to other architectures with different antenna configurations. As example, a device with 3×3, when in that case a 2×2 resource on one channel and a 1×1 on another channel.

In one example, a multi-link operation 218 may enable a single-radio non-AP MLD to achieve throughput enhancement and latency reduction in a busy network without needing to implement a concurrent dual-radio, thus significantly reducing device cost.

Figure 3:
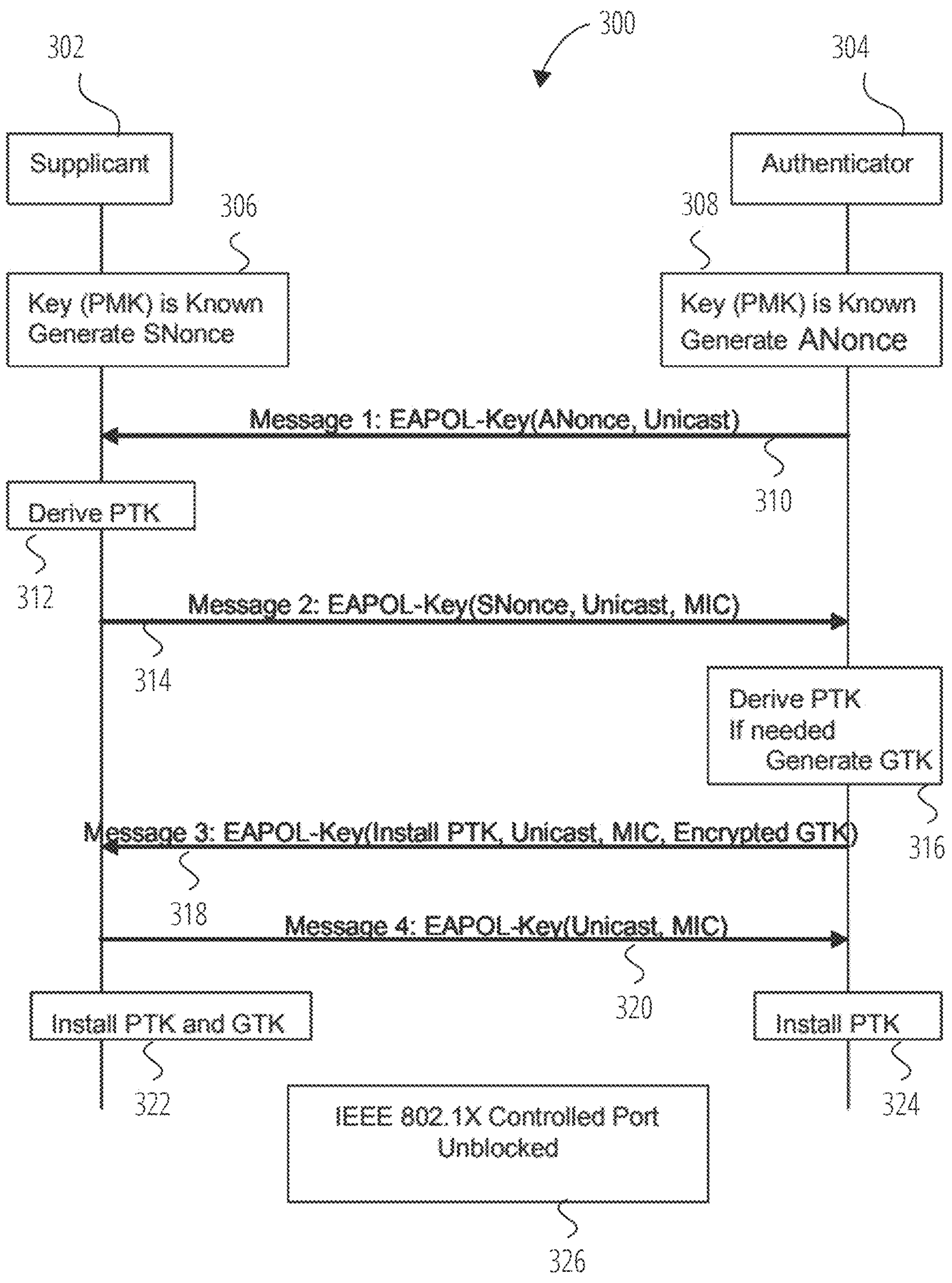
FIG. 3 illustrates a call flow of a 4-way handshake, in accordance with some aspects of the present technology.

FIG. 3 illustrates a 4-way handshake 300, which is the process of exchanging four messages between an authenticator 304 and a supplicant 302 to generate encryption keys, which are then used to encrypt data sent over a wireless channel in the wireless network 200. The generated encryption keys can include a Pairwise Transient Key (PTK) and a group temporal key (GTK). The PTK can be used, e.g., to encrypt all unicast traffic between a given STA 204 and a given AP 202 (i.e., the PTK is unique between the given STA 204 and the given AP 202). The GTK can be used to encrypt all broadcast and multicast traffic between multiple STAs 204 and the APs 202. The GTK is the key that is shared between all STA 204 in the BSSID.

The 4-way handshake 300 can use EAPOL-Key frames and can be initiated by the Authenticator to do the following: confirm that a live peer holds the PMK; confirm that the PMK is current; derive a fresh Pairwise Transient Key (PTK) from the PMK; install the pairwise encryption and integrity keys into IEEE 802.11; transport from the authenticator 304 to the supplicant 302, which can be a STA, the group temporal key (GTK); transport the GTK sequence number from the authenticator 304, which can be an AP, to the supplicant 302; install the GTK and GTK sequence number in the STAs 204 and, if not already installed, in the APs 202; and confirm the cipher suite selection.

At step 306, the supplicant 302 has a Pairwise Master Key (PMK) and uses the PMK to generate a SNonce (supplicant nonce).

At step 308, the authenticator 304 uses the PMK to generate an ANonce (authenticator nonce).

At step 310, the authenticator 304 sends to the supplicant 302 message 1 (M1), which includes the ANonce. The 4-way handshake 300 can use EAPOL-Key frames to transmit the four messages: message 1 (M1) 310; message 2 (M2) 314; message 3 (M3) 318; and message 4 (M4) 320. EAPOL-Key frames are special key management frames used by STAs to derive key information and establish secure communication. EAPOL-Key frames are also used to update expired temporal keys between associated stations. For example, the EAPOL-Key frames can be protected by a 128-bit key confirmation key (KCK) and a 128-bit key encryption key (KEK). For example, these keys are used with an AES algorithm in which the messages are encrypted with the 128-bit KEK using the AES key wrap defined in RFC 3394. The key wrap encrypts the data in 64-bit blocks, mixing in the output of the previous block to prevent repeating input from producing repeating output.

At step 312, the supplicant derives the PTK. According to certain non-limiting examples, the PTK is generated between the given STA 204 and the given AP 202, according to the following expression:

$$PTK=PRF(PMK+Anonce+SNonce+Mac(AA)+Mac(SA)),$$

where PRF is a pseudo-random function, ANonce is a random number generated by the authenticator 304, SNonce is a random number generated by the supplicant 302, and the MAC addresses of the supplicant 302 and the authenticator 304 are Mac (AA) and Mac (SA) respectively.

At step 314, using EAPOL-Key frames, the supplicant 302 sends to the authenticator 304 the message M2, which includes the SNonce and the message integrity code/check (MIC). That is, upon generating the PTK, the supplicant 302 sends out SNonce, which is needed by the authenticator 304 *t* to also generate PTK. The supplicant 302 sends M2 in an EAPOL-key frame to the authenticator 304 with the MIC to ensure the authenticator 304 can verify whether this message was corrupted or modified. Once the SNonce is received, the authenticator 304 can generate the PTK for unicast traffic encryption.

At step 316, the authenticator 304 derives the PTK and uses the PTK to generate the GTK, which is discussed below. The GTK can be generated using a simpler process than the PTK because they can be delivered and protected by the EAPOL-Key frames. An authentication server maintains a randomly generated group master key (GMK), which can be used as input to the PRF along with a random number to generate the GTK.

At step 318, using EAPOL-Key frames, the authenticator 304 sends to the supplicant 302 the message M3, which includes the SNonce and the message integrity code/check (MIC). Once the authenticator 304 has generated the GTK, the authenticator 304 encrypts the GTK and sends it to the supplicant 302 on the network protected by EAPOL-Key frames. If one of the STAs 204 leaves the network, the APs 202 can generate a new GTK from the GMK and a new random number.

At step 320, using EAPOL-Key frames, the supplicant 302 sends to the authenticator 304 the message M2, which confirms that the keys have been installed.

At step 322, the supplicant 302 installs the GTK.

At step 324, the authenticator 304 installs the GTK.

At step 326, upon successful completion of the 4-way handshake 300, the authenticator 304 and supplicant 302 have authenticated each other; and the IEEE 802.1X controlled ports are unblocked to permit general data traffic.

A 4-Way Handshake utilizing EAPOL-Key frames is initiated by the Authenticator to do the following: —Confirm that a live peer holds the PMK. —Confirm that the PMK is current. —Derive a fresh Pairwise Transient Key (PTK) from the PMK. Install the pairwise encryption and integrity keys into IEEE 802.11. —Transport the group temporal key (GTK) and GTK sequence number from Authenticator to Supplicant and install the GTK and GTK sequence number in the STA and, if not already installed, in the AP. —Confirm the cipher suite selection.

Figure 4:
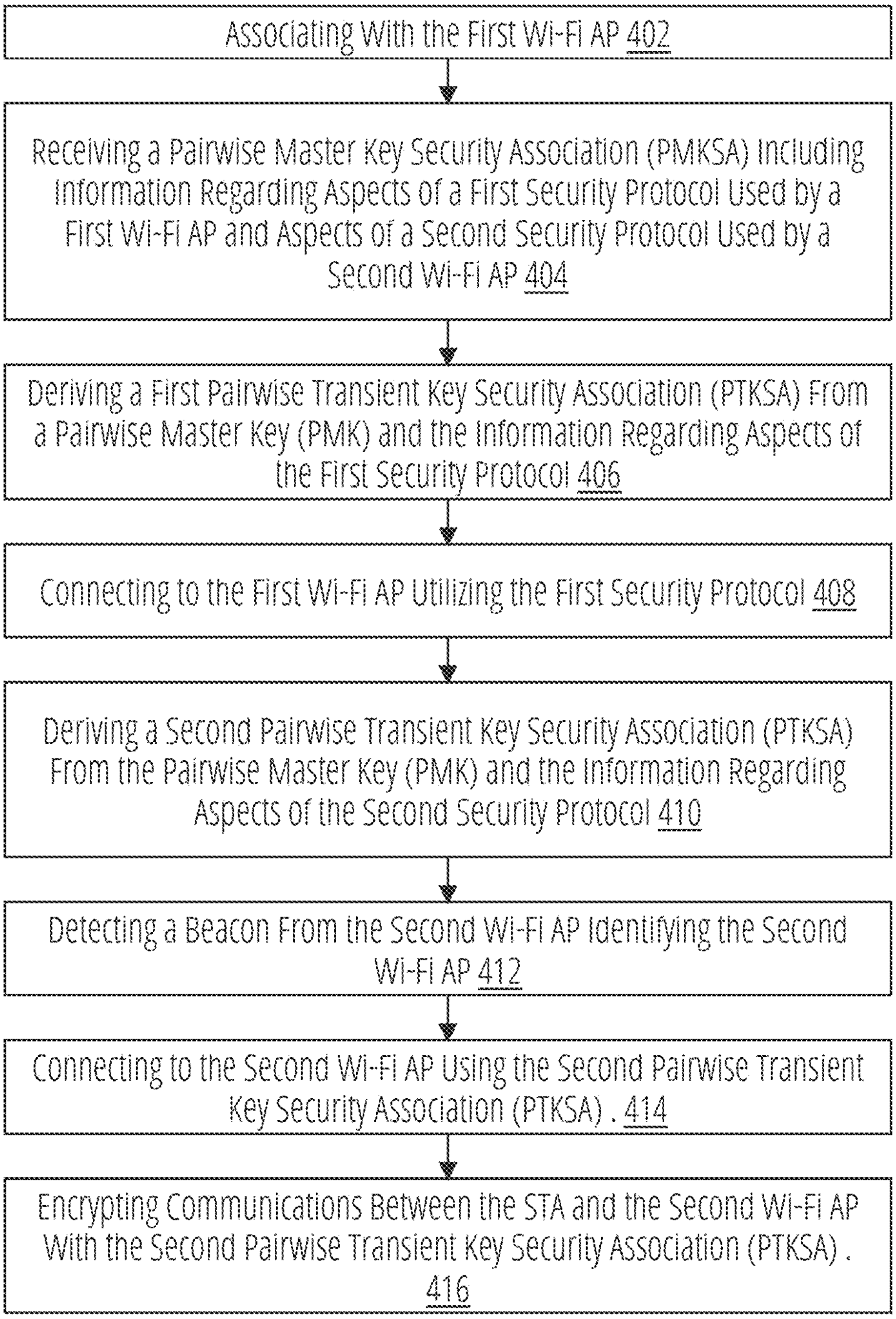
FIG. 4 illustrates an example routine for transitioning from a first Wi-Fi AP utilizing a first security protocol to a second Wi-Fi AP utilizing a second security protocol in the same extended service set (ESS) in accordance with some aspects of the present technology.
Figure 5:
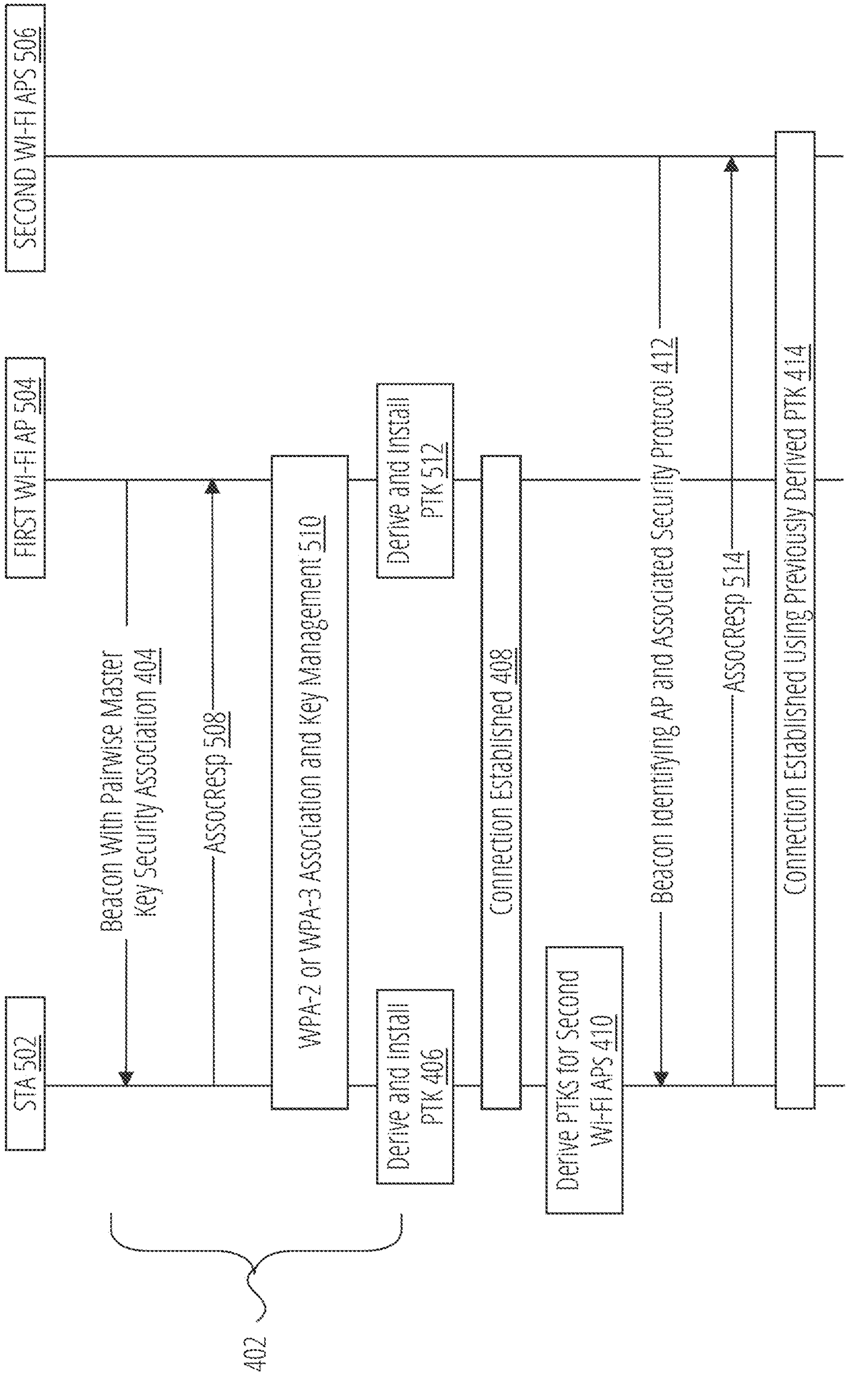
FIG. 5 illustrates a sequence diagram transitioning from a first Wi-Fi AP utilizing a first security protocol to a second Wi-Fi AP utilizing a second security protocol in the same extended service set (ESS) in accordance with some aspects of the present technology.

FIG. 4 illustrates an example routine for transitioning from a first Wi-Fi AP utilizing a first security protocol to a second Wi-Fi AP utilizing a second security protocol in the same extended service set (ESS). FIG. 5 illustrates a sequence diagram transitioning from a first Wi-Fi AP utilizing a first security protocol to a second Wi-Fi AP utilizing a second security protocol in the same extended service set (ESS). FIG. 4 and FIG. 5 will be explained together. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

The present technology has improved the roaming process by enhancing the Pairwise Master Key (PMK) to include all AKM and cipher suites supported in the ESS. This means that an STA can generate a PTKSA for all supported AKM and cipher suites during the first-time association with a first Wi-Fi AP and 4-way handshake. This allows the STAs to utilize pre-existing PTKSAs as they move across APs.

In the present technology, Access Points (APs) advertise their supported AKMs and cipher suites to serve active links for different STA types. Additionally, APs advertise all AKMs and cipher suites supported by the ESS across both legacy and EHT APs. The present technology involves an enhanced PMKSA derivation that includes multiple AKMs across the ESS. The prior mechanism, as described in 802.11 2020 12.6.1.1.2 PMKSA, generates PMKSA only once per (re) association for each AKM type and doesn't include multiple AKMs. The present technology includes information about multiple associations and key management (AKM) used in the extended service set (ESS) and is used by the STA to generate multiple Pairwise Transient Keys (PTKs) for each association and key management (AKM) and cipher suite combination deployed in the extended service set (ESS), during the initial association with a first Wi-Fi AP. Thereafter, when the STA detects a beacon from a second Wi-Fi AP, it uses the association and key management (AKM) type and cipher suite from the Robust Security Network Information Element (RSNIE) of the beacon to identify the Pairwise Transient Key (PTK) to use for the second Wi-Fi AP.

According to some examples, the method being with the STA 104 illustrated in FIG. 1 associating with the first Wi-Fi AP at block 402.

According to some examples, associating with the first Wi-Fi AP includes receiving a Pairwise Master Key Security Association (PMKSA) including information regarding aspects of a first security protocol used by a first Wi-Fi AP and aspects of a second security protocol used by a second Wi-Fi AP at block 404. For example, the STA 502 illustrated in FIG. 5 may receive a Pairwise Master Key Security Association (PMKSA) including information regarding aspects of a first security protocol used by a first Wi-Fi AP and aspects of a second security protocol used by a second Wi-Fi AP.

Figure 6:
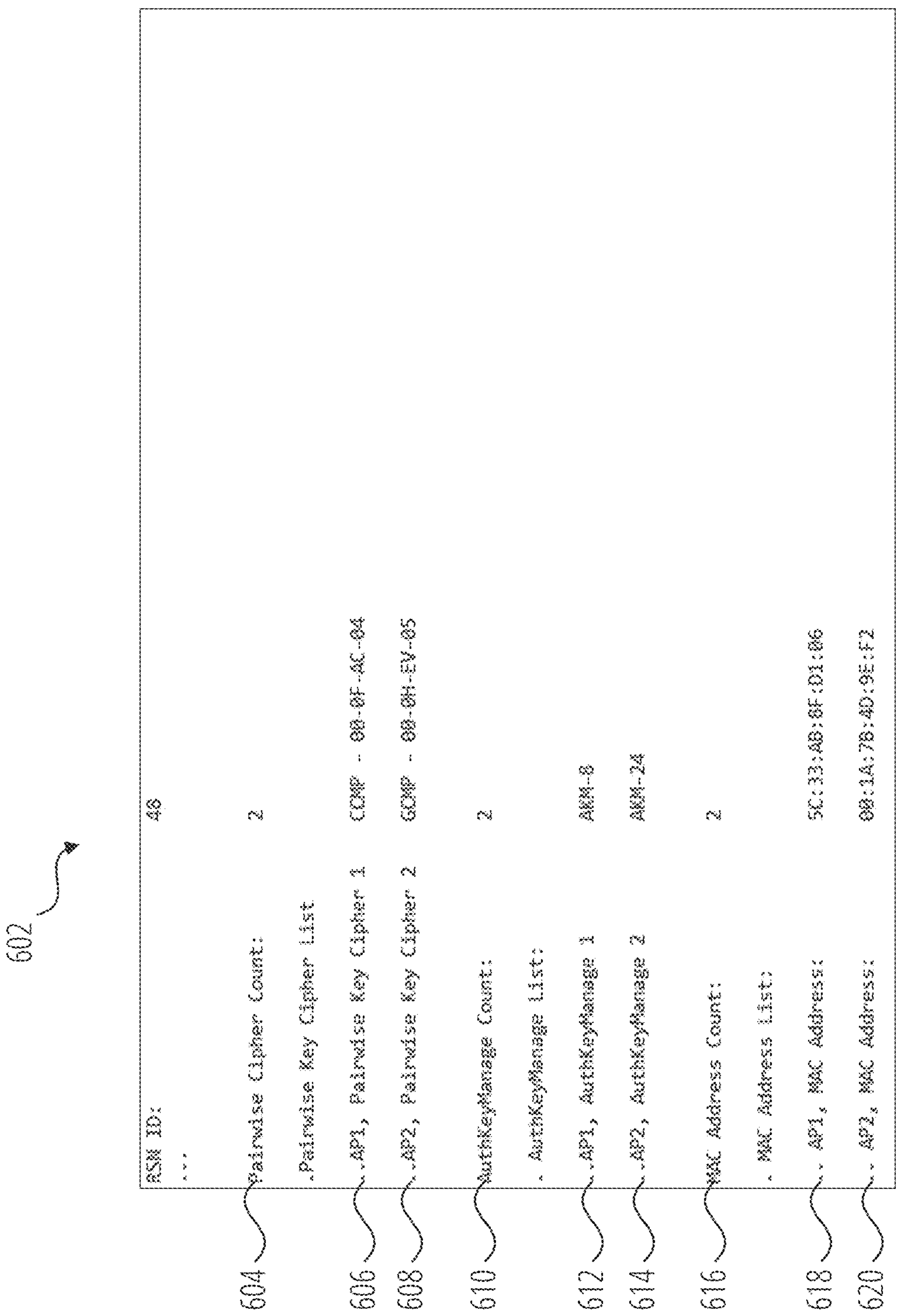
FIG. 6 illustrates a simplified example of a Robust Security Network Information Element (RSNIE) 602 sent to communicate the Pairwise Master Key Security Association (PMKSA) in accordance with some aspects of the present technology.

A simplified example of a Robust Security Network Information Element (RSNIE) sent to communicate the Pairwise Master Key (PMK) is illustrated in FIG. 6. For example, the Robust Security Network Information Element (RSNIE) includes information regarding the first security protocol such as a first AKM version 612 and a first cipher suite 606 used by the first Wi-Fi AP 618. The information regarding the second security protocol is a second AKM version 614 and a second cipher suite 608 used the second Wi-Fi AP 620. The first security protocol is WPA-2 and the second security protocol is WPA-3. The first security protocol includes performing a 4-way handshake under WPA-2 and the second security protocol utilizes a Simultaneous Authentication of Equals (SAE) under WPA-3. The first Wi-Fi AP and the second Wi-Fi AP are part of the same extended service set (ESS), and utilize the same Pairwise Master Key (PMK).

According to some examples, associating with the first Wi-Fi AP further includes the STA 502 providing an association response 508 informing the first Wi-Fi AP 504 that the STA 502 has selected the first Wi-Fi AP 504 to connect. Thereafter, the STA 502 and first Wi-Fi AP 504 undergo the WPA-2 or WPA-3 association and key management (AKM) 510 depending on the WPA version indicated in the beacon 404 including the Pairwise Master Key (PMK) and accompanying Robust Security Network Information Element (RSNIE) (as illustrated for example in FIG. 6). An example of the WPA-2 or WPA-3 association and key management (AKM) 510 is shown in more detail in FIG. 3.

According to some examples, the associating with the first Wi-Fi AP further includes deriving a first Pairwise Transient Key Security Association (PTKSA) from a Pairwise Master Key (PMK) and the information regarding aspects of the first security protocol at block 406. For example, the STA 502 illustrated in FIG. 5 may derive a first Pairwise Transient Key Security Association (PTKSA) from a Pairwise Master Key (PMK) and the information regarding aspects of the first security protocol. The first Wi-Fi AP 504 also derives and installs its version of the first Pairwise Master Key (PMK) (512). The first Pairwise Transient Key Security Association (PTKSA) is used in connecting to the first Wi-Fi AP utilizing the first security protocol.

According to some examples, the method includes connecting to the first Wi-Fi AP utilizing the first security protocol at block 408. For example, the STA 502 illustrated in FIG. 5 may connect to the first Wi-Fi AP utilizing the first security protocol.

According to some examples, the method includes deriving a second Pairwise Transient Key Security Association (PTKSA) from the Pairwise Master Key (PMK) and the information regarding aspects of the second security protocol at block 410. For example, the STA 502 illustrated in FIG. 5 may derive a second Pairwise Transient Key Security Association (PTKSA) from the Pairwise Master Key (PMK) and the information regarding aspects of the second security protocol.

While the deriving 410 is shown in FIG. 5 to occur after the STA 502 connects 408 to the first Wi-Fi AP 504, this is not required, though it makes logical sense. While the STA 502 can attempt to perform all PTKSA generations for all of the APs in the extended service set (ESS) when it is associating with the first Wi-Fi AP 504, this may be computationally expensive. To mitigate this possibility the information regarding aspects of a first security protocol in the Robust Security Network Information Element (RSNIE) can be identified as priority for use in deriving the first Pairwise Transient Key Security Association (PTKSA) needed to connect to the first Wi-Fi AP 504. In this way the STA 502 can defer computation of additional Pairwise Transient Keys (PTKs) for use with other Wi-Fi APs in the extended service set (ESS) until after the STA 502 is associated with the first Wi-Fi AP 504.

Regardless of exactly when the STA 502 derives the additional Pairwise Transient Keys (PTKs), a benefit of the present technology comes from deriving the additional Pairwise Transient Keys (PTKs) prior to connecting to the second Wi-Fi AP (and prior to the detecting (412) a beacon from the second Wi-Fi AP.

According to some examples, the method includes detecting a beacon from the second Wi-Fi AP identifying the second Wi-Fi AP at block 412. For example, the STA 502 illustrated in FIG. 5 may detect a beacon from the second Wi-Fi AP identifying the second Wi-Fi AP. The beacon can identify the second Wi-Fi APs 506 by its MAC address and as such the STA 502 can already know the appropriate cipher suite and can have already calculated the Pairwise Transient Key (PTK) needed to associate with the second Wi-Fi APs 506.

According to some examples, the method includes connecting to the second Wi-Fi AP using the second Pairwise Transient Key Security Association (PTKSA) at block 414. For example, the STA 502 illustrated in FIG. 5 may connect to the second Wi-Fi AP using the second Pairwise Transient Key Security Association (PTKSA). The connecting to the second Wi-Fi AP is performed without performing a AKM protocol with the second Wi-Fi AP.

As described herein, the present technology will work whenever the second Wi-Fi APs 506 is a Wi-Fi 8 AP or later generation. Wi-Fi 8 is the first generation to explicitly allow connections between a multi-link device (MLD) STA and multiple different APs sharing security associations. However, if the second Wi-Fi APs 506 is a Wi-Fi 7 device, the second Wi-Fi APs 506 might be unprepared to communicate with the STA 502 because the security associations established under Wi-Fi 7 and earlier rely on specific MAC address pairings between the specific AP and STA. In the present context, the STA 502 has learned of the MAC address of the second Wi-Fi APs 506 in the beacon received at block 404 and used it to calculate the proper Pairwise Transient Key (PTK), but the second Wi-Fi APs 506 has not learned the same information about the STA 502. Accordingly, the present technology anticipates either that Wi-Fi 7 and earlier generations might be adapted to overcome this limitation, or in any event, that the present technology is useful to roam from a first Wi-Fi AP 504 that is a Wi-Fi 7 or earlier generation to second Wi-Fi APs 506 of Wi-Fi 8 generation or later.

Additionally, the present technology can be useful even when transitioning between any first Wi-Fi AP 504 and second Wi-Fi APs 506 regardless of the limitation of specific MAC address pairings by repeating some steps of the WPA-2 or WPA-3 association and key management (AKM) 510, although this will be less efficient.

The present technology is also useful with devices such as Wi-Fi 8 or later generation devices that are configured for multi-link operation. The present technology can be used whenever at least the STA 502 is a multi-link device (MLD) to establish connections to the first Wi-Fi AP 504 and the second Wi-Fi APs 506 simultaneously. For example, when the STA 502 is a multi-link device (MLD), the connecting (414) to the second Wi-Fi AP occurs while the STA remains connected to the first Wi-Fi AP. The STA can also be configured to utilize a make before you break roaming (MBBR) transition to the second Wi-Fi AP.

According to some examples, the method includes encrypting communications between the STA and the second Wi-Fi AP with the second Pairwise Transient Key (PTK) at block 416. For example, the STA 502 illustrated in FIG. 5 may encrypt communications between the STA and the second Wi-Fi AP with the second Pairwise Transient Key (PTK).

FIG. 6 illustrates a simplified example of a Robust Security Network Information Element (RSNIE) 602 sent as part of a Robust Security Network Element (RSNE) to communicate the Pairwise Master Key Security Association (PMKSA). The Pairwise Master Key Security Association (PMKSA) generally includes information about the cipher, the association and key management (AKM), and the MAC address for the specific AP to which the STA is connecting. In the present technology, the Pairwise Master Key Security Association (PMKSA) lists such information for multiple APs and indicated by the MAC address count 616 indicating more than one MAC address. Additionally the Pairwise Master Key Security Association (PMKSA) indicates that two ciphers are presented under the Pairwise Cipher Count 604 and that two association and key management (AKM) versions are presented under the association and key management (AKM) count 610.

More specifically, Robust Security Network Information Element (RSNIE) 602 illustrates the cipher 606, and first AKM version 612, used with AP1 having the MAC address 618. And Robust Security Network Information Element (RSNIE) 602 also includes cipher 608, and second AKM version 614, used with AP2 having the MAC address 620.

While the Robust Security Network Information Element (RSNIE) 602 in FIG. 6 only illustrates ciphers and AKM versions for two different APs, it should be appreciated that the Robust Security Network Information Element (RSNIE) 602 can include this information for all such APs in the extended service set (ESS).

Figure 7:
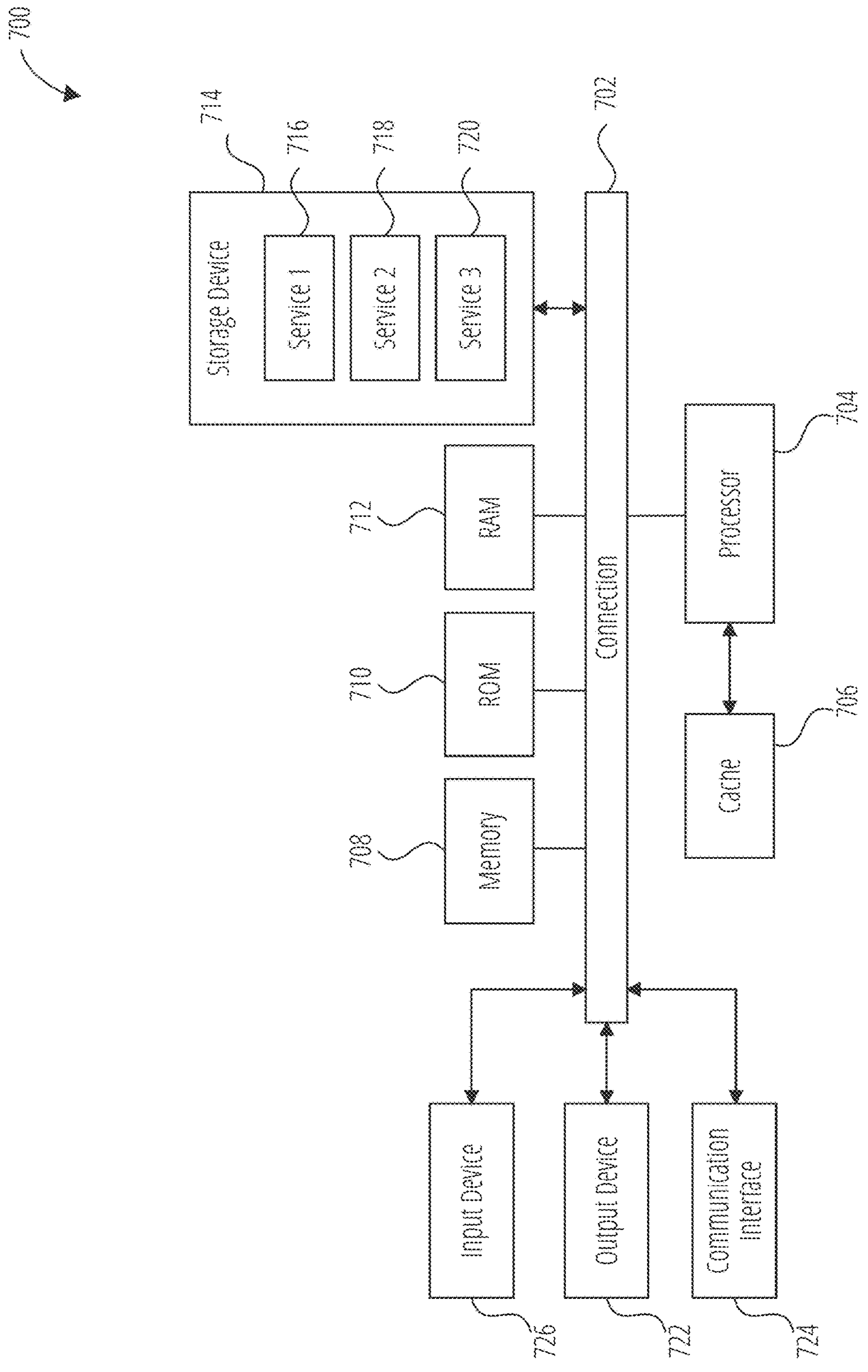
FIG. 7 shows an example of a system for implementing certain aspects of the present technology.

FIG. 7 shows an example of computing system 700, which can be for example any computing device making up an AP or STA or WLC, or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) 704 and connection 702 that couples various system components including system memory 708, such as read-only memory (ROM) 710 and random access memory (RAM) 712 to processor 704. Computing system 700 can include a cache of high-speed memory 706 connected directly with, in close proximity to, or integrated as part of processor 704.

Processor 704 can include any general purpose processor and a hardware service or software service, such as services 716, 718, and 720 stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, keyboard, mouse, motion input, speech, etc. Computing system 700 can also include output device 722, which can be one or more of a number of output mechanisms known to those of skill in the art. In some instances, multimodal systems can enable a user to provide multiple types of input/output to communicate with computing system 700. Computing system 700 can include communication interface 724, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 714 can include software services, servers, services, etc., that when the code that defines such software is executed by the processor 704, it causes the system to perform a function. In some embodiments, a hardware service that performs a particular function can include the software component stored in a computer-readable medium in connection with the necessary hardware components, such as processor 704, connection 702, output device 722, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some aspects of the present technology include:

Aspect 1. A method comprising: receiving, by an STA, a Pairwise Master Key Security Association (PMKSA) including information regarding aspects of a first security protocol used by a first Wi-Fi AP and aspects of a second security protocol used by a second Wi-Fi AP; deriving a first Pairwise Transient Key Security Association (PTKSA) and a first Pairwise Transient Key (PTK) from a Pairwise Master Key (PMK) and the information regarding the aspects of the first security protocol, the first Pairwise Transient Key Security Association (PTKSA) used in connecting to the first Wi-Fi AP utilizing the first security protocol; connecting to the first Wi-Fi AP utilizing the first security protocol; and prior to connecting to the second Wi-Fi AP, deriving, by the STA a second Pairwise Transient Key Security Association (PTKSA) and a second Pairwise Transient Key (PTK) from the Pairwise Master Key (PMK) and the information regarding the aspects of the second security protocol.

Aspect 2. The method of Aspect 1, further comprising: detecting, by the STA a beacon from the second Wi-Fi AP identifying the second Wi-Fi AP; and connecting, by the STA, to the second Wi-Fi AP using the second Pairwise Transient Key Security Association (PTKSA), wherein the connecting to the second Wi-Fi AP is performed without performing a AKM protocol with the second Wi-Fi AP.

Aspect 3. The method of any of Aspects 1 to 2, further comprising: encrypting communications between the STA and the second Wi-Fi AP with the second Pairwise Transient Key (PTK).

Aspect 4. The method of any of Aspects 1 to 3, wherein the information regarding the first security protocol is a first AKM version and a first cipher suite used by the first Wi-Fi AP, and the information regarding the second security protocol is a second AKM version and a second cipher suite used by the second Wi-Fi AP.

Aspect 5. The method of any of Aspects 1 to 4, wherein the first Wi-Fi AP and the second Wi-Fi AP are part of an extended service set (ESS), wherein the first Wi-Fi AP and the second Wi-Fi AP utilized the Pairwise Master Key (PMK).

Aspect 6. The method of any of Aspects 1 to 5, wherein the information regarding the aspects of the first security protocol in the Pairwise Master Key Security Association (PMKSA) is identified as priority for use in deriving the first Pairwise Transient Key Security Association (PTKSA) needed to connect to the first Wi-Fi AP.

Aspect 7. The method of any of Aspects 1 to 6, wherein the STA is a multi-link device (MLD), the wherein the connecting to the second Wi-Fi AP occurs while the STA remains connected to the first Wi-Fi AP.

What is claimed is:

1. A method comprising:

receiving, by an STA and from a first Wi-Fi AP, a Pairwise Master Key Security Association (PMKSA) including information regarding aspects of a first security protocol used by the first Wi-Fi AP and aspects of a second security protocol used by a second Wi-Fi AP;

deriving a first Pairwise Transient Key Security Association (PTKSA) and a first Pairwise Transient Key (PTK) from a Pairwise Master Key (PMK) and the information regarding the aspects of the first security protocol, the first Pairwise Transient Key Security Association (PTKSA) used in connecting to the first Wi-Fi AP utilizing the first security protocol;

connecting to the first Wi-Fi AP utilizing the first security protocol; and prior to detecting a beacon from the second Wi-Fi AP and connecting to the second Wi-Fi AP, deriving, by the STA a second Pairwise Transient Key Security Association (PTKSA) and a second Pairwise Transient Key (PTK) from the Pairwise Master Key (PMK) and the information regarding the aspects of the second security protocol.

2. The method of claim 1, further comprising:

detecting, by the STA a beacon from the second Wi-Fi AP identifying the second Wi-Fi AP; and connecting, by the STA, to the second Wi-Fi AP using the second Pairwise Transient Key Security Association (PTKSA), wherein connecting to the second Wi-Fi AP is performed without performing a AKM protocol with the second Wi-Fi AP.

3. The method of claim 1, further comprising:

encrypting communications between the STA and the second Wi-Fi AP with the second Pairwise Transient Key (PTK).

4. The method of claim 1, wherein the information regarding the first security protocol is a first AKM version and a first cipher suite used by the first Wi-Fi AP, and the information regarding the second security protocol is a second AKM version and a second cipher suite used by the second Wi-Fi AP.

5. The method of claim 1, wherein the first Wi-Fi AP and the second Wi-Fi AP are part of an extended service set (ESS), wherein the first Wi-Fi AP and the second Wi-Fi AP utilized the Pairwise Master Key (PMK).

6. The method of claim 1, wherein the information regarding the aspects of the first security protocol in the Pairwise Master Key Security Association (PMKSA) is identified as priority for use in deriving the first Pairwise Transient Key Security Association (PTKSA) needed to connect to the first Wi-Fi AP.

7. The method of claim 1, wherein the STA is a multi-link device (MLD), and wherein connecting to the second Wi-Fi AP occurs while the STA remains connected to the first Wi-Fi AP.

8. A computing apparatus comprising:

a processor, and a memory storing instructions that, when executed by the processor, configure the computing apparatus to:

receive, from a first Wi-Fi AP, a Pairwise Master Key Security Association (PMKSA) including information regarding aspects of a first security protocol used by the first Wi-Fi AP and aspects of a second security protocol used by a second Wi-Fi AP;

derive a first Pairwise Transient Key Security Association (PTKSA) and a first Pairwise Transient Key (PTK) from a Pairwise Master Key (PMK) and the information regarding the aspects of the first security protocol, the first Pairwise Transient Key Security Association (PTKSA) used in connecting to the first Wi-Fi AP utilizing the first security protocol;

connect to the first Wi-Fi AP utilizing the first security protocol; and prior to detecting a beacon from the second Wi-Fi AP and connecting to the second Wi-Fi AP, derive a second Pairwise Transient Key Security Association (PTKSA) and a second Pairwise Transient Key (PTK) from the Pairwise Master Key (PMK) and the information regarding the aspects of the second security protocol.

9. The computing apparatus of claim 8, wherein the instructions further configure the computing apparatus to:

detect a beacon from the second Wi-Fi AP identifying the second Wi-Fi AP; and connect to the second Wi-Fi AP using the second Pairwise Transient Key Security Association (PTKSA), wherein connecting to the second Wi-Fi AP is performed without performing a AKM protocol with the second Wi-Fi AP.

10. The computing apparatus of claim 8, wherein the processor is further configure to execute the instructions to:

encrypt communications between the STA-computing apparatus and the second Wi-Fi AP with the second Pairwise Transient Key (PTK).

11. The computing apparatus of claim 8, wherein the information regard the first security protocol is a first AKM version and a first cipher suite used by the first Wi-Fi AP, and the information regarding the second security protocol is a second AKM version and a second cipher suite used by the second Wi-Fi AP.

12. The computing apparatus of claim 8, wherein the first Wi-Fi AP and the second Wi-Fi AP are part of an extended service set (ESS), wherein the first Wi-Fi AP and the second Wi-Fi AP utilized the Pairwise Master Key (PMK).

13. The computing apparatus of claim 8, wherein the information regard the aspects of the first security protocol in the Pairwise Master Key Security Association (PMKSA) is identified as priority for use in deriving the first Pairwise Transient Key Security Association (PTKSA) needed to connect to the first Wi-Fi AP.

14. The computing apparatus of claim 8, wherein the computing apparatus is a multi-link device (MLD), and wherein connecting to the second Wi-Fi AP occurs while the STA computing apparatus remains connected to the first Wi-Fi AP.

15. A non-transitory computer-readable storage medium including instructions that when executed by a device, cause the device to:

receive, from a first Wi-Fi AP, a Pairwise Master Key Security Association (PMKSA) including information regarding aspects of a first security protocol used by a first Wi-Fi AP and aspects of a second security protocol used by a second Wi-Fi AP;

derive a first Pairwise Transient Key Security Association (PTKSA) and a first Pairwise Transient Key (PTK) from a Pairwise Master Key (PMK) and the information regarding the aspects of the first security protocol, the first Pairwise Transient Key Security Association (PTKSA) used in connecting to the first Wi-Fi AP utilizing the first security protocol;

connect to the first Wi-Fi AP utilizing the first security protocol; and prior to detecting a beacon from the second Wi-Fi AP and connecting to the second Wi-Fi AP, derive a second Pairwise Transient Key Security Association (PTKSA) and a second Pairwise Transient Key (PTK) from the Pairwise Master Key (PMK) and the information regarding the aspects of the second security protocol.

16. The non-transitory computer-readable storage medium of claim 15, wherein execution of the instructions further configure the device to:

detect a beacon from the second Wi-Fi AP identifying the second Wi-Fi AP; and connect to the second Wi-Fi AP using the second Pairwise Transient Key Security Association (PTKSA), wherein connecting to the second Wi-Fi AP is performed without performing a AKM protocol with the second Wi-Fi AP.

17. The non-transitory computer-readable storage medium of claim 15, wherein the information regard the first security protocol is a first AKM version and a first cipher suite used by the first Wi-Fi AP, and the information regarding the second security protocol is a second AKM version and a second cipher suite used by the second Wi-Fi AP.

18. The non-transitory computer-readable storage medium of claim 15, wherein the first Wi-Fi AP and the second Wi-Fi AP are part of an extended service set (ESS), wherein the first Wi-Fi AP and the second Wi-Fi AP utilized the Pairwise Master Key (PMK).

19. The non-transitory computer-readable storage medium of claim 15, wherein the information regard the aspects of the first security protocol in the Pairwise Master Key Security Association (PMKSA) is identified as priority for use in deriving the first Pairwise Transient Key Security Association (PTKSA) needed to connect to the first Wi-Fi AP.

20. The non-transitory computer-readable storage medium of claim 15, wherein the device is a multi-link device (MLD), and wherein connecting to the second Wi-Fi AP occurs while the device remains connected to the first Wi-Fi AP.

* * * * *